United States Patent [19]

Gutjahr

[11] Patent Number: 4,599,063
[45] Date of Patent: Jul. 8, 1986

[54] INJECTION MOLDING APPARATUS HAVING DIE CLOSING AND LOCKING MEANS

[75] Inventor: Lothar Gutjahr, Denzlingen, Fed. Rep. of Germany

[73] Assignee: Klöckner-Werke Aktiengesellschaft, Duisburg, Fed. Rep. of Germany

[21] Appl. No.: 463,112

[22] Filed: Feb. 2, 1983

[30] Foreign Application Priority Data

Feb. 4, 1982 [DE] Fed. Rep. of Germany ....... 3203810

[51] Int. Cl.⁴ ............................................. B29C 45/68
[52] U.S. Cl. .................................... 425/150; 264/40.5;
425/451.2; 425/590; 425/DIG. 223
[58] Field of Search ............... 264/40.5; 425/149, 150,
425/451.2, 590, DIG. 223, 156, 157, 135, 145;
91/35, 380

[56] References Cited

U.S. PATENT DOCUMENTS

| | | |
|---|---|---|
| 3,226,769 | 1/1966 | Williamson et al. ................ 425/590 |
| 3,564,659 | 2/1971 | Koch et al. ........................ 425/149 |
| 3,590,439 | 7/1971 | Swanson ...................... 137/533.17 |
| 3,677,685 | 7/1972 | Aoki ................................ 425/453 |
| 3,767,339 | 10/1973 | Hunkar .............................. 425/149 |
| 3,797,364 | 3/1974 | Schulze ................................ 91/35 |
| 3,825,235 | 7/1974 | Schwertfeger et al. ............ 425/145 |
| 3,857,658 | 12/1974 | Muzsnay .......................... 425/451.2 |
| 3,888,388 | 6/1975 | Mahoney ............................ 425/145 |
| 3,889,849 | 6/1975 | Chandler ............................ 425/145 |
| 3,912,434 | 10/1975 | Nagahara et al. .................. 425/142 |
| 3,940,930 | 3/1976 | Rosander ............................ 425/590 |
| 3,941,534 | 3/1976 | Hunkar .............................. 425/149 |
| 3,941,543 | 3/1976 | Hunkar .............................. 425/145 |
| 4,009,983 | 3/1977 | Jacobs ............................ 425/451.2 |
| 4,222,725 | 9/1980 | Rodgers ............................ 425/145 |
| 4,253,358 | 3/1981 | Schulze ................................ 82/5 |
| 4,321,026 | 3/1982 | Lambertus ........................ 425/142 |
| 4,540,359 | 9/1985 | Yamazaki .......................... 425/135 |

FOREIGN PATENT DOCUMENTS

| | | |
|---|---|---|
| 2155130 | 11/1971 | Fed. Rep. of Germany . |
| 2336529 | 3/1973 | Fed. Rep. of Germany ...... 425/149 |
| 2533303 | 2/1977 | Fed. Rep. of Germany . |
| 2541733 | 3/1977 | Fed. Rep. of Germany . |
| 56-99644 | 8/1981 | Japan ................................ 425/149 |
| 56-159136 | 12/1981 | Japan ................................ 425/149 |
| 57-29434 | 2/1982 | Japan ................................ 425/149 |

OTHER PUBLICATIONS

SIG–Elektrohydraulische Linearverstärker, "Type LVN, LVK, LVH", (Publication I).
SIG–Hydraulischer Linearverstärker, "Type LV, (Publication II).
Electrohydraulic Linear Amplifier LVS, "10th edition, 1977", Hartmann and Lammle KG, (Publication III).

Primary Examiner—Jay H. Woo
Assistant Examiner—J. Fortenberry
Attorney, Agent, or Firm—Watson, Cole, Grindle & Watson

[57] ABSTRACT

An injection molding apparatus having movable die operated by a piston and cylinder, includes a hydraulic circuit having a supply line for closing and opening the movable die. A branch line from the supply line leads into a die locking chamber defined between the piston and cylinder, and a first multi-directional control valve is provided for control of the closing mechanism. A second multi-directional valve is located in the branch line for feeding hydraulic fluid into the die locking chamber as sensed by a pressure sensor in the supply line. A threaded spindle meshes with a support for the movable die which feeds back the rate of travel and pressure exerted by the movable die to a stepping motor which varies the spindle rotation in accordance with the rate and the pressure. The first control valve shifts relative to the spindle during its rotation to thereby pressurize the plunger which is sensed at a predetermined value for delivering hydraulic fluid into the die locking chamber when the movable die is closed.

3 Claims, 1 Drawing Figure

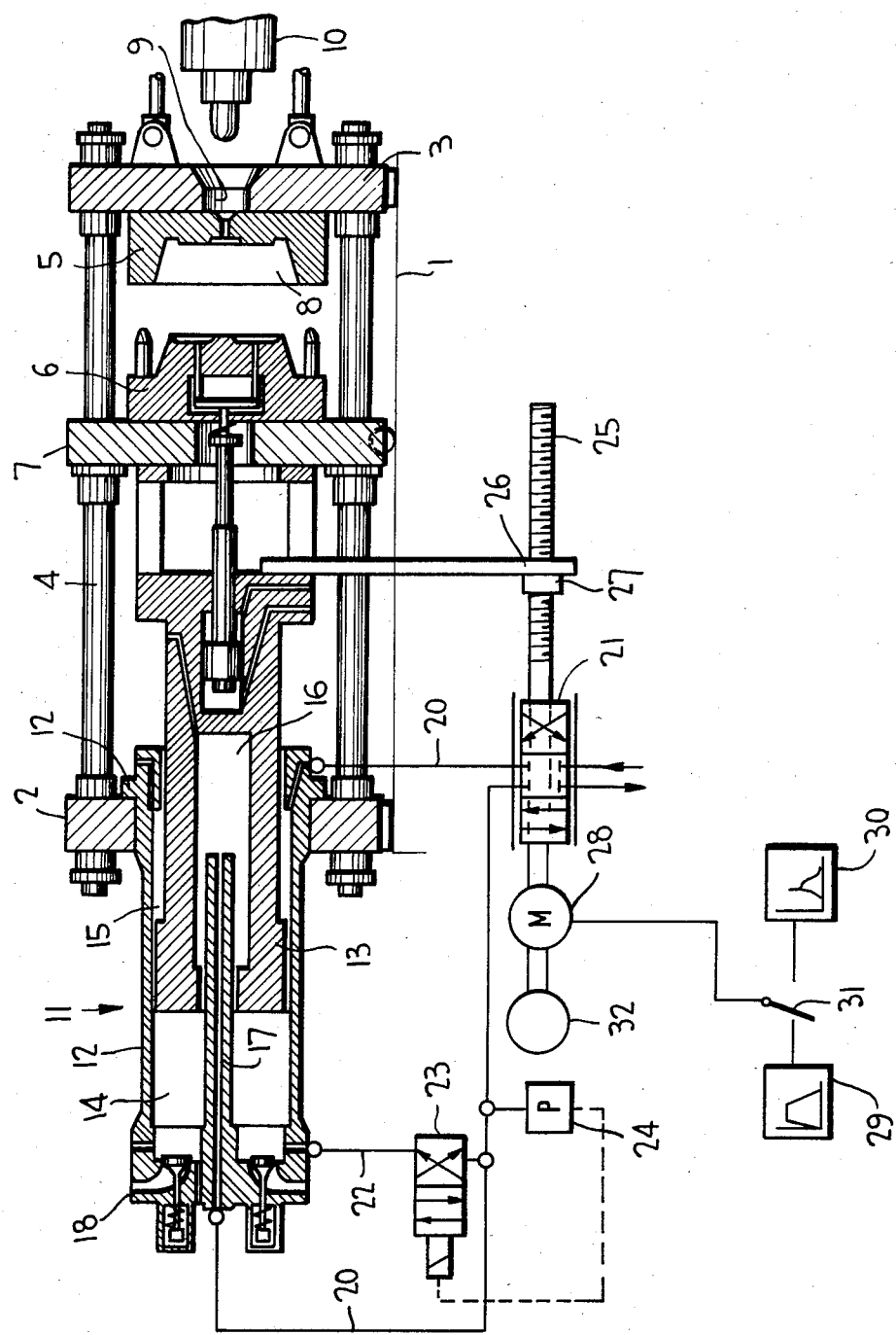

INJECTION MOLDING APPARATUS HAVING DIE CLOSING AND LOCKING MEANS

RELATED APPLICATION

This application relates to U.S. Ser. No. 463,113 filed Feb. 2, 1983, and based on West German application No. P 32 03 763.

BACKGROUND OF THE INVENTION

This invention relates generally to means for closing and locking the movable die of an injection molding apparatus, the movable die being operated by a piston and cylinder unit and being locked upon application of pressure to a die locking chamber after the movable die is closed.

Known injection molding apparatus have a pair of matching dies, one of which being mounted on a stationary die plate and the other mounted on a sliding die plate. The sliding die plate is guided on rails or rods, and the piston of a pressurized piston and cylinder unit is connected thereto for opening and closing the movable die as quickly as possible. And, since the material injected into the die exerts considerable pressure on the die plates, tending to open them after closing, an appropriate die locking force must be exerted on the movable die. Die locking hydraulic cylinders are typically provided for this purpose. Thus, the two functions, namely, the sliding of the die and the locking of the die has heretofore been carried out separately, as set forth in West German Pat. Nos. 2,453,697 and 1,268,322.

Since the piston for closing and opening the die must operate at a relatively low pressure, and since the die locking cylinder must normally be pressurized with considerable locking pressure, a substantial amount of hydraulic working fluid had to be utilized in the past.

SUMMARY OF THE INVENTION

It is therefore an object of the present invention to provide a closing and locking mechanism for the movable die plate of an injection molding apparatus by simplifying the hydraulic circuit by applying pressure both upon the die opening and closing piston and upon the die locking cylinder via a supply line to the opening and closing piston.

In carrying out the invention, an elongated, threaded, rotatable spindle is threadedly connected with a die plate on which the movable die is mounted. A hydraulic piston and cylinder unit operates the movable die relative to the fixed die, and a hydraulic means operates such unit. Such means includes a hydraulic supply line having a hydraulic branch line leading to a die-locking chamber defined by the piston and cylinder. A first multi-directional control valve is located in the supply line and is mounted for shifting movement to vary the flow of hydraulic fluid, the valve being mounted on the spindle. A stepping motor is provided for rotation of the spindle to thereby shift the first valve for initiating a pre-selected rate of travel of the piston and/or the pressure variation of the piston and cylinder unit. A second multi-directional control valve is located in the branch line for directing the hydraulic fluid into the die-locking chamber upon the closing of the movable die. Thus, the movable die can be moved with precision so that pressure is applied to the die-locking chamber precisely at the moment when the moving die is closed. The motor is controlled in accordance with a predetermined pressure or speed variation of the moving die, with the result that the motor turns the spindle and at the same time the valve body of the first control valve is moved accordingly, thereby allowing a greater or lesser passage area for the working fluid, so that the operating piston is pressurized properly and the movable die carries out an appropriate movement. This, in turn, results in an appropriate movement of the valve body of the second valve in an operative direction which, in turn, is counteracted by the stepping motor in accordance with the predetermined pressure speed variation. Thus, a hydraulically strong feedback or fixed closed-looped circuit is produced, with the result that the movement of the sliding die is controlled with any desired precision, which essentially depends upon the accuracy of the spindle.

Hydraulic components which operate under this principle of hydraulically fixed feedback are disclosed in a publication of Hartmann and Laemmle KG, entitled "Electrohydraulic Linear Amplifiers LVS", 10th edition 1977. These components have, however, been only employed for the exact positioning of machine components that can slide on machine tools, for example.

BRIEF DESCRIPTION OF THE DRAWING

The single drawing FIGURE is a longitudinal sectional view of an injection molding apparatus showing the hydraulic operating circuit which incorporates the invention.

DETAILED DESCRIPTION OF THE INVENTION

The present injection molding apparatus includes a support bed 1 on which a pair of spaced, parallel support plates 2 and 3 are fixedly mounted, and a plurality of guide rods or rails 4 lying parallel to the central axis of the plates being affixed at opposite ends to the plates. A die 5 of a pair of mating dies 5, 6 is affixed to support plate 3, and the other die 6 is mounted on a movable die plate 7 for movement together therewith along guide rods 4. The confronting dies define a die cavity 8 therebetween into which plastic material is inserted through a die opening 9 via an injection unit 10.

A die closing mechanism, generally designated 11, is in the form of a hydraulic piston and cylinder unit which comprises a cylinder 12 fixedly mounted on support plate 2, and a plunger or piston 13 arranged for reciprocating movement therein and being connected to movable die 6 through die plate 7. The piston, together with cylinder 12, delimits a die-locking chamber 14 which, when pressurized, effects a locking of the movable die relative to its fixed die, as will be described in more detail hereinafter. A pressurized chamber 15 is defined between the piston and cylinder on the opposite side of the piston head for retracting the piston when pressurized, and a pressurized chamber 16 is defined in a hollow space within the piston for extending the piston when pressurized. The piston slides along a hollow tubular rod 17 which is in telescoping engagement therewith, the rod being fixedly secured to a closure head 18 of the cylinder, and the rod being interconnected with a portion of a pressure supply line 20 of a hydraulic circuit which operates the closing mechanism. Another portion of supply line 20 is interconnected with chamber 15, and a multi-directional valve 21, connected with a hydraulic fluid inlet and outlet, is coupled into the supply line for controlling the plunger reciprocation to thereby operate the die 6 closing and opening movements.

The supply line includes a branch line 22 connected to chamber 14 and includes a second multi-directional control valve 23. Also, a pressure sensor 24 is located in supply line 20 and is operatively interconnected with valve 23, as shown by the dashed line, for switching valve 23 into an open position after a predetermined pressure has been attained in the supply line, to thereby apply pressure to chamber 14 to lock movable die 6 into its closed position.

An elongated, threaded, rotatable spindle 25 is mounted on a support rod extending from die plate 7 via a support arm 26 having an internally threaded collar 27 in meshed engagement with the spindle. And, the valve body of control valve 21 is mounted on the spindle so as to be, and thereby capable of shifting along with the spindle upon spindle rotation about its central axis. This spindle rotation is effected by means of a stepping motor 28 which is controlled in accordance with a preselected rate of travel of the piston and/or its pressure variation. The values are stored in accordance with the distance travelled by movable die 6, such distance being determined by accumulators 29 and 30 in cooperation with a toggle 31 extending from the motor. And, a step-by-step transmitter 32 is coupled with the shaft of the stepping motor or with movable die 6 for indicating the actual distance travelled by die 6. By comparing the actual with the desired value, the control system can be converted to a closed-looped circuit. Also, with this arrangement, it is possible to determine the particular position of movable die 6 after a temporary power failure without having to move it to one or the other position first in order to redefine its zero position. However, the important advantage lies in the fact that a closed-looped system is provided for the closing mechanism for determining the actual value of the distance travelled by movable die 6 and by means of the stored values.

From the foregoing it can be seen that the stepping motor, which is controlled in accordance with a predetermined pressure or speed variation of movable die 6, rotates the spindle which shifts control valve 21 accordingly to thereby allow a greater or lesser passage area through which the hydraulic fluid flows from the hydraulic fluid source (not shown). The travelling plunger is thus properly pressurized and the movable die is appropriately moved. This, in turn, results in an appropriate movement of the valve body which is counteracted by the stepping motor in accordance with the predetermined pressure speed variation.

Also, it should be pointed out that the threaded spindle and collar may be substituted by some other suitable means such as a rack and pinion gear.

Obviously, many other modifications and variations of the present invention are made possible in light of the above teachings. It is therefore to be understood that within the scope of the appended claims the invention may be practiced otherwise than as specifically described.

What is claimed is:

1. An injection molding apparatus, comprising a pair of spaced, parallel support plates, guide rods affixed to and extending between said plates and lying parallel to a central axis thereof, a die plate mounted on said rods for sliding movement therealong, a fixed die mounted on one of said support plates, a movable die confronting said fixed die and being mounted on said die plate for movement therewith, a hydraulic piston and cylinder unit for moving said movable die relative to said fixed die during the molding operation, said unit comprising a hydraulic cylinder fixedly mounted on the other of said support plates and a piston connected to said movable die, said piston having a die closing chamber, said piston defining with said cylinder a die retracting chamber and a die-locking chamber, hydraulic means for operating said piston and cylinder unit, said means comprising a single hydraulic circuit to which said die closing and retracting chambers are connected, said circuit having a hydraulic branch line leading to said die-locking chamber, a linear amplifier having hydraulically fixed feedback and comprising a first multi-directional control valve in said circuit and being mounted for shifting movement to control the flow of hydraulic fluid through said circuit for closing and opening said movable die, an elongated threaded rotatable spindle threadedly connected with said die plate for axial displacement relative thereto upon rotation of said spindle, said first valve being mounted on said spindle for shifting together therewith upon spindle rotation, a stepping motor coupled with said spindle for rotation of said spindle so as to thereby shift said first valve for initiating at least one of a preselected rate of travel of said piston and the pressure variation of said piston and cylinder unit, whereby rotation of said spindle effects the movement of said first valve to control the flow of hydraulic fluid, the movement of said movable die effecting an oppositely directed movement of said first valve via said spindle which is counteracted by said motor, and a second multi-directional control valve in said branch line for directing the hydraulic fluid into said die-locking chamber upon the closing of said movable die.

2. The apparatus according to claim 1, wherein a pressure sensor is located in said circuit for sensing the pressure supplied to said piston and, when a predetermined pressure has been attained, switching said second valve open.

3. The apparatus according to claim 1, wherein a step transmitter is in meshed engagement with one of said spindle and said motor for measuring the distance travelled by said movable die.

* * * * *